United States Patent [19]

Kasenga et al.

[11] Patent Number: 4,892,757

[45] Date of Patent: Jan. 9, 1990

[54] METHOD FOR A PRODUCING MANGANESE ACTIVATED ZINC SILICATE PHOSPHOR

[75] Inventors: Anthony F. Kasenga, Towanda, Pa.; Leslie F. Gray, Waverly, N.Y.; Thomas L. Henson; MacInnis, Martin B., both of Towanda, Pa.

[73] Assignee: GTE Products Corporation, Stamford, Conn.

[21] Appl. No.: 288,659

[22] Filed: Dec. 22, 1988

[51] Int. Cl.$^4$ .............................................. C09K 11/59
[52] U.S. Cl. ................................. 427/215; 252/301.5; 252/301.6 F; 427/372.2
[58] Field of Search ................... 252/301.6 F; 427/64, 427/67, 215, 372.2

[56] References Cited

U.S. PATENT DOCUMENTS

| | | | |
|---|---|---|---|
| 2,118,091 | 5/1938 | Leverenz | 252/301.6 F |
| 2,210,087 | 8/1940 | Leverenz | 252/301.6 F |
| 3,208,950 | 9/1965 | Yocom et al. | 252/301.6 F |
| 3,416,019 | 12/1968 | Kaduk | 252/301.6 F |
| 4,585,673 | 4/1986 | Sigai | 427/215 |
| 4,710,674 | 12/1987 | Sigai | 427/213 |
| 4,728,459 | 3/1988 | Fan et al. | 252/301.6 F |
| 4,803,400 | 2/1989 | Peters et al. | 427/215 |
| 4,825,124 | 4/1989 | Sigai | 252/301.6 F |

*Primary Examiner*—Jack Cooper
*Attorney, Agent, or Firm*—Donald R. Castle

[57] ABSTRACT

A method is disclosed for reproducibly producing manganese activated zinc silicate phosphor particles, which comprises dry blending a mixture of components consisting essentially of zinc oxide, silicic acid, a source of manganese, ammonium chloride, ammonium fluoride, tungstic oxide, and silica, wherein the Zu+Mn/Si mole ratio is from about 1.95 to about 2.02, wherein the silica is colloidal and has a surface area of from about 50 to about 410 m$^2$ per gram, and wherein the colloidal silica makes up from about 0.01% to about 1.0% by weight of the mixture, and firing the resulting dry blend of components in a nitrogen atmosphere at a temperature of from about 1200° C. to about 1300° C. for a sufficient time to produce the phosphor wherein the phosphor exhibits reproducible brightness.

8 Claims, 1 Drawing Sheet

METHOD FOR A PRODUCING MANGANESE ACTIVATED ZINC SILICATE PHOSPHOR

This invention is related to application Ser. No. 288,660-Pending entitled "Firing and Milling Method for Producing A Manganese Activated Zinc Silicate Phosphor," which is filed concurrently herewith.

This invention relates to a method for producing a mangnaese activated zinc silicate phosphor wherein a source of colloidal silica of high surface area is blended with the starting components from which the phosphor is made. This results in reproducible production of high quality phosphor brightness. Moreover, blending time is reduced and there is greater flexibility in the Zn+Mn/Si mole ratio that can be used. This allows for more flexibilitly in formulation and blending and better reproducibility in manufacturing the phosphor. The invention relates also to coating the phosphor with an aluminum oxide coating to improve maintenance of the phosphor.

BACKGROUND OF THE INVENTION

In the production of manganese activated zinc silicate phosphors, excess silicic acid with long blending times are used with fluxes and long firing times in order to achieve a good reaction. This phosphor requires a high manganese concentration that is necessary for high luminescence efficiency and it is difficult to achieve a good blend especially with the zinc component. Sometimes this phosphor manufactured by these methods results in a brown or yellow discoloration and very poor fluoroescent lamps. This is due possibly to minute traces of unincorporated manganese with the unreacted zinc component.

SUMMARY OF THE INVENTION

In accordance with one aspect of the invention, there is provided a method for reproducibly producing manganese activated zinc silicate phosphor particles, which comprises dry blending a mixture of components consisting essentially of zinc oxide, silicic acid, a source of manganese, ammonium chloride, ammonium fluoride, and silica, wherein the Zn+Mn/Si mole ratio is from about 1.95 to about 2.02, wherein the silica is colloidal and has a surface area of from about 50 to about 410 $m^2$ per gram, and wherein the colloidal silica makes up from about 0.01% to about 1.0% by weight of the mixture, and firing the resulting dry blend of components in a nitrogen atmosphere at a temperature of from about 1200° C. to about 1300° C. for a sufficient time to produce the phosphor wherein the phosphor exhibits reproducible brightness.

DETAILED DESCRIPTION OF THE INVENTION

Figure 1:
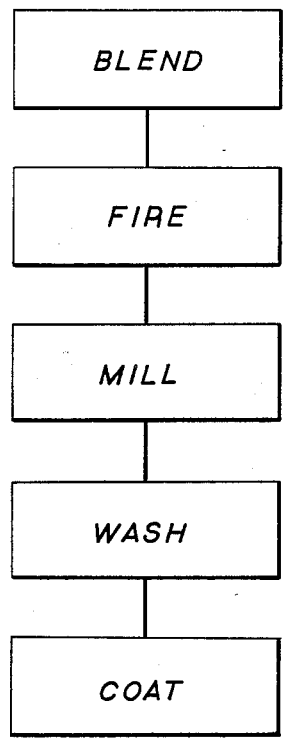
FIG. 1 is a schematic diagram of the preferred steps in the process of the present invention.

For a better understanding of the present invention, together with other and further objects, advantages and capabilities thereof, reference is made to the following disclosure and appended claims in connection with the above described drawing and description of some of the aspects of the invention.

The phosphor produced by the process of this invention is manganese activated zinc silicate having the formula $Zn_2SiO_4$:Mn.

The first step in making the phosphor is to dry blend a mixture of the starting components which will be subsequently fired to produce the phosphor. The starting components are zinc oxide, silicic acid, a source of manganese, preferably manganese carbonate, and fluxes such as ammonium chloride, ammonium fluoride and tungstic oxide. Tungstic oxide improves the maintenance of the phosphor as described in U.S. Pat. No. 4,728,450. A typical composition of this mixture is given in the example that ensues. The mole ratio of Zn+Mn/Si is from about 1.95 to about 2.02. In addition to the above components, a source of colloidal silica is added to make the mixture. The content of this silica in the mixture ranges from about 0.01% to about 1.0% by weight and preferably from about 0.03% to about 0.3% by weight. This range of silica content allows the resulting phosphor to have reproducible brightness when tested in fluorescent lamps. The silica is colloidal and characterized by a high surface area. The surface area is from about 50 to about 410 $m^2$ per gram, preferably from about 100 to about 300 $m^2$ per gram and most preferably from about 175 to about 225 $m^2$ per gram. A preferred source of this type of silica is manufactured by Degussa, Inc. New York, N.Y. under the trade name of "Aerosil". According to a technical bulletin by Degussa, Aerosil® is a colloidal silica manufactured by a flame hydrolysis of silicon tetrachloride in the gas phase. Aerosil® is supplied in various surface areas as designated by the number after the name. Especially suited to the purposes of the present invention is Aerosil® which has a high surface area of about $200 \pm 25$ $m^2/g$ with a primary particle size of about 12 millimicrons. This is a very pure silica which has unusual electrical and optical properties.

The resulting blended mixture is then fire in nitrogen at a temperature of from about 1200° C. to about 1300° C. and preferably at about 1250° C. for a sufficient time preferably about 2.5 hours to produce the phosphor.

The phosphor is preferably subjected to light milling to clean the surfaces of the phosphor particles and to remove any surface manganese which is present. By light milling is meant that the duration of milling time is relatively short, that is, the duration is typically from about 20 minutes to about 30 minutes. The milling is done preferably by milling with citric acid, washing with water, filtering, drying and classifying such as by sieving to obtain the desired particle size for use in the application.

The addition of colloidal silica to the formulation blend as described above achieves a more intimate blend and results in reproducible and high quality phosphor lots when evaluated in a fluorescent lamp. Table 1 exhibits lamp data on nine lots made with 0.1% by weight colloidal silica in the mixture. Over about 5,000 lumens at zero hours are achieved in six of the eight lots (1-1, 1-4, 1-5, 1-6, 1-7, and 1-8) with the remaining three lots achieving over about 4900 lumens at zero hours (1-2, 1-3, and 1-9). Table 1 also demonstrates that this high luminosity is achieved at lower $NH_4^F$ concentrations (¼, ½), by drum blending half the normal time (DB, 8 hr) or by V-blending (a preferred blending technique). These results are contrasted with previous lots as listed on Table 2 that are formulated without collidal silica. These lots are inferior when evaluated in a fluorescent lamp and occasionally result in a brown fired cake.

V-blending does not result in high luminosity phosphors as exhibited in lots 2-3 and 2-14, although this is normally a preferred blending technique.

TABLE 1

Phosphor Formulated with 0.1% by Weight Colloidal Silica

| # | Formulation NH4F | NH4Cl | Blending Type | Firing Time | Temp. | Powder wt | Lamp Data Lumens |
|---|---|---|---|---|---|---|---|
| 1-1 | Std | Std | DB | 16 hr 7 min | Std | 7.7 | 5023 |
| 1-2 | ½* | Std | DB | 8 hr 8 min | Std | 8.2 | 4932 |
| 1-3 | ¼ | Std | DB | 8 hr 8 min | Std | 6.4 | 4978 |
| 1-4 | Std | Std | DB | 8 hr 8 min | Std | 7.6 | 5115 |
| 1-5 | Std | Std | DB | 8 hr 8 min | Std | 8.1 | 5109 |
| 1-6 | Std | Std | VB | 1 hr 8 min | Std | 6.1 | 5070 |
| 1-7 | ¼** | 2.12 ×*** | DB | 8 hr 8 min | Std | 8.9 | 5111 |
| 1-8 | ¼ | Std | VB | 1¼ hr 8 min | Std | 6.4 | 5073 |
| 1-9 | ¼ | Std | VB | 1¼ hr 8 min | Std | 6.4 | 4906 |

Std — Standard concentration or standard temperature
DB — Drum blending
VB — V-Blending
*½ of Std
**¼ of Std
***2.12 × Std

TABLE 2

Phosphor Formulated Without Colloidal Silica

| # | Formulation NH4F | NH4Cl | Blending Type | Firing Time | Temp. | Powder wt | Lamp Data Lumens |
|---|---|---|---|---|---|---|---|
| 2-1 | Std | Std | DB | 16 hr 7 min | Std | — | 4326 |
| 2-2 | Std | Std | DB | 16 hr 7 min | Std | — | 4699 |
| 2-3 | Std | Std | VB | 1 hr 7 min | Std | — | 4419 |
| 2-4 | Std | Std | DB | 16 hr 7 min | Std | — | 4664 |
| 2-5 | Std | Std | DB | 16 hr 7 min | Std | 8.3 | 4820 |
| 2-6 | Std | Std | DB | 16 hr 7 min | Std | 9.7 | 4739 |
| 2-7 | Std | Std | DB | 16 hr 7 min | Std | 10.6 | 4512 |
| 2-8 | Std | Std | DB | 16 hr 7 min | Std | 10.6 | 4512 |
| 2-9 | Std | Std | DB | 16 hr 7 min | Std | 10.3 | 4565 |
| 2-10 | Std | Std | DB | 16 hr 7 min | Std | 11.5 | 4782 |
| 2-11 | Std | Std | DB | 16 hr 7 min | Std | 11.7 | 4666 |
| 2-12 | Std | Std | DB | 16 hr 7 min | Std | 12.0 | 4805 |
| 2-13 | Std | Std | DB | 16 hr 7 min | Std | 11.9 | 4719 |
| 2-14 | Std | Std | VB | 1 hr 7 min | Std | 13.3 | 4826 |
| 2-15 | Std | Std | DB | 16 hr 7 min | Std | 10.1 | 4836 |

To demonstrate that the addition of colloidal silica improves the intimacy of the blend a test of reduced blending time is completed using a drum blender. The blending time is reduced from the typical 16 hours to about 4 hours when the colloidal silica is used according to the present invention.

Table 3 below shows the length of drum blending time with addition of Aerosil ® on lamp performance.

TABLE 3

| Sample | Blending Time (Hr.) | Powder weight | 0 Hr. Lamp Output Lumens | Comments |
|---|---|---|---|---|
| 3-1 | 4 | 6.5 | 5071 | |
| 3-2 | 8 | 7.1 | 5015 | |
| 3-3 | 10 | 7.4 | 5042 | |
| 3-4 | 12 | 7.0 | 5065 | |
| 3-5 | 14 | 6.6 | 5043 | |
| 3-6 | 16 | 7.2 | 4928 | Normal blending time Control |
| 3-7 | — | 4.9 | 4367 | Commercial phosphor-lamp control |

It can be seen that when Aerosil ® is used reproducible brightness of over about 5000 lumens is attained with less blending time (a decrease from about 16 hours to about 4 hours). As previously demonstrated in Table 2, without Aerosil ® a 16 hour blending time does not reproducibly achieve a high lumen quality.

The incorporation of the colloidal silica into the initial mixture of components results in greater flexibility of the mole ratio of $Zn+Mn/Si$ than when this silica is not used.

Prior to the present invention, the mole ratio of $Zn+Mn/Si$ is limited to 1.97 to achieve a high degree of reactivity and good quality brightness in a lamp. With the addition of colloidal silica according to the present invention greater latitude in the mole ratio is possible. For example, with colloidal silica, a mole ratio of $Zn+Mn/Si$ of $>2$ such as 2.02, a brightness of $>5000$ lumens at zero hours is achieved when the phosphor is tested in a lamp. The brightness is high also at lower mole ratios of $Zn+Mn/Si$ of, for example, 1.99, 1.98, and 1.95.

It is believed that the advantage of the incorporation of the colloidal silica into the mixture is that the reaction of the zinc with the manganese and the silicon is more complete as opposed to incompleteness when the colloidal silica is not used. This incomplete reaction is indicated by a brownish color in the fired material or poor luminosity in fluorescent lamps. The brown material contains unreacted zinc oxide with manganese present.

Once the manganese activated zinc silicate phosphor is made as described above, the phosphor particles can be coated with a continuous coating of aluminum oxide. This coated phosphor exhibits increased maintenance or longer life than the phosphor produced absent the coating.

The advantages associated with the phosphor of the present invention are illustrated by the lamp performance of the phosphor when particles are individually coated with a continuous protective coating. Individually and continuously coated phosphor particles are prepared by depositing a contiuous, nonparticulate, conformal, aluminum oxide coating on the outer surfaces of the individual phosphor particles. Such coating can be applied by coating methods such as, for example, chemical vapor deposition or preferably chemical vapor deposition in a fluidized bed. Most preferably, the continuously coated individual phosphor particles are prepared by the method described in U.S. Pat. No. 4,585,673, Apr. 29, 1986. That patent is herein incorporated by reference.

The particles of the phosphor of the present invention are individually and continuously coated with a nonparticulate, conformal, continuous coating of alumina using the coating method of U.S. Pat. No. 4,585,673. Prior to coating, the phosphor is admixed with a fluidizing aid, such as aluminum oxide C (manufactured by DeGussa, Inc.) The admixture contains about 0.05% by weight fluidizing aid with respect to the phosphor. About two hundred sixty grams of the admixture are loaded into the reactor. The coating method parameters are:

| | |
|---|---|
| Carrier gas ($N_2$) | 500 cc/mm |
| Alkyl bubbler flow ($N_2$) | 150 cc/mm |
| Oxygen flow | 500 cc/mm |
| Oxygen carrier ($N_2$) | 50 cc/mm |
| Hot zone (Highest temperature) | 500° C. |

The coating precurser material is trimethyl aluminum. The calculated aluminum oxide coating thickness is about 100 Angstroms. The surface area of the uncoated phosphor is about 0.39 $m^2$/g which is within the preferred range of 0.31–0.39 meters/gram. High resolution scanning electron micrographs of coated phosphor particles show that the aluminum oxide coating is conformal. The coating growth is enhanced where fluidizing aid particles adhere to the phosphor particle surface during fluidizing and the coating process. Augur analysis confirm complete coverage of the surface of the individual phosphor particles with aluminum oxide. "Continuous" as used herein to describe the aluminum oxide coating herein means nonparticulate, i.e., the aluminum oxide coating surrounding each phosphor particle does not consist of individual aluminum oxide particles.

The key features of the aluminum oxide coated phosphor particles of the present invention are: (1) the continuous, or nonparticulate, nature of the coating on each particle, (2) the conformal nature of the coating on each particle, replicating submicron features from naturally occurring on the uncoated phosphor particles, and (3) that each phosphor particle is individually coated.

These key features of the coated phosphor particles of the present invention are established and/or supported by Scanning Electron Microscopy (SEM), Augur analysis, reflection electron diffraction techniques, and BET measurements.

Scanning Electron Microscopy of the coated particles shows that the particles are individually coated, that the aluminum oxide coating on the phosphor particles is continuous and does non consist of aluminum oxide particles, and that the coating is conformal, replicating the submicron features of the underlying phosphor particle.

Augur analysis indicates that the coating provids substantially complete coverage of the outer surface of the phosphor particles.

Reflection electron diffraction shows the aluminum oxide coating to be noncrystalline, i.e., amorphous.

BET measurements support the conformal and continuous nature of the aluminum oxide coating the extent the surface area of the coated phosphor is not appreciably changed when compared to the surface area of the uncoated phosphor. If the coating were particulate in nature, the surface area of the coated phosphor would be significantly increased. BET measurements also support that the phosphor particles are individually coated.

The coated phosphor particles are incorporated into a 40 Watt T12 fluorescent lamp without conventional "milling", using wet-sieving techniques and an organic suspension system. The phosphor coating is applied to the inner surface of the lamp envelope and the lamp is otherwise processed using conventional lamp processing techniques.

The coated phosphor particles can be annealed in an air atmosphere at a temperature of from about 700° C. to about 850° C. for a period of from about 15 minutes to about 20 hours.

To more fully illustrate this invention, the following nonlimiting example is presented.

EXAMPLE 1

The following amounts of materials are weighted out:

| Material | Mole ratio | Weight (kg) |
|---|---|---|
| ZnO | 2.00000 | 25.0620 |
| Silicic acid | 1.07700 | 9.9650 |
| $MnCO_3$ | 0.13170 | 2.3310 |
| $NH_4Cl$ | 0.0465 | 0.3830 |
| $NH_4F$ | 0.00400 | 0.0228 |
| $WO_3$ | 0.00116 | 0.0248 |
| Aerosil ® 200 | 0.00432 | 0.0400 |
| | Total | 37.8286 |

These materials are addd to a 50 gallon drum with 12 kg of milling media. This material is drum blended for about 16 hours. The milling media are removed from the above blend. The blended material is fired in a continuous furnace in alumina crucibles at about 1250° C. for about 2.5 hours in $N_2$. The firing is ramped up about to 1250° C. in 2.0 hours and the fired material is cooled to room temperature in about 3.5 hours. The fired material is then milled with citric acid, washed, filtered, dried and sieved. The results of this example are given as No. 6 in Table 3.

EXAMPLE 2

About 200 kg of $Zn_2SiO_4$:Mn phosphor are produced with the addition of Aerosil ® according to the procedure described in Example 1 using production equipment. The resulting fluorescent lamp output with this phosphor at 0 hours is about 5237 and about 5113 lumens when evaluated in an organic or water base slurry system respectively.

EXAMPLE 3

A chemical vapor deposited (CVD) aluminum oxide coating is applied to manganese activated zinc silicate phosphors produced using colloidal silica, utilizing a fluid bed coating technique. As shown in Table 5, a blend of about 300 g to about 375 g of the phosphor and about 0.05% by weight of a fluidization aid such as Aluminum Oxide C is loaded into a fluid bed column comprising a 4 mm ID quartz tube having a quartz frit fused to the bottom acting as a distributor plate. A 32 mm quartz agitator disc is positioned inside the quartz tube. the agitator disc is attached to a vibromixer agitator. About 50 mm from the base of the agitator a series of five holes of about 20 mils in diameter (about 0.5 mm) are circumferentially located. The agitator disc itself is located about 25 mm above the quartz distributor. A series of about 6¼ inch copper coil windings are located immediately around the frit located at the bottom of the quartz tube such that one coil is below the distributor and the remaining five coils are above the distributor plate. The total length of the coil assembly is about 55 mm of which about 45 mm are above the distributor plate. In addition, there is a copper foil of about 70 mm which is sandwiched between the cooling coil and the quartz tube to provide improved heat transfer. In addition there is insulation located above the copper coil to further reduce heat transfer between the heated and the unheated portions of the tube. This insulation comprises about 50 mm of 1" Fiberfax roll insulation. The edge of The Fiberfax insulation matches exactly the level between the unheated and heated part of the 3 Zone Lindberg furnace, that is, below the bottom and center zones of the furnace. The furnace zones are 6", 12", and 6" in length, and a spike thermocouple is located at the midpoint of each zone. The operating conditions for the fluid bed CVD aluminum oxide coating of the phosphor are shown in Table 4. The height of the phosphor bed is from about 300 mm to about 400 mm. The amount of phosphor charged into the column is from about 300 g to about 375 g. The external thermocouple is located against the outside wall of the quartz column level with the 5 holes in the agitator shaft where the oxygen/inert gas mixture enters the fluidized phosphor bed. The temperatures recorded by the external thermocouple during the coating operation range from about 342° C. to about 435° C. as shown in Table 4. The first two furnace zones are set for about 500° C. and the last zone is shut off. The flow rates shown in Table 4 ranging from about 250 cc/min of an inert gas such as nitrogen, argon, helium, neon, or mixtures thereof for the bubbler and from about 350 cc/min to about 400 cc/min of the inert gas for the carrier are the flow rates that pass through the distributor plate at the bottom of the quartz column. A fluidized phosphor bed is formed by passing the inert gas upwardly through the phosphor particles in order to suspend the particles in the inert gas stream. In addition to supporting the phosphor particles in a fluidized bed, the inert gas functions as a carrier gas for the vaporized trimethyl aluminum. The inert gas is passed through the bubbler containing liquid trimethyl aluminum at about 30° C. and the liquid trimethyl aluminum is vaporized into the inert gas before passing through the distributor plate into the fluidized phosphor bed. The vaporized trimethyl aluminum envelopes the fluidized phosphor particles. A continuous protective aluminum oxide coating is formed on the surfaces of the individual phosphor particles when the vaporized trimethyl aluminum is exposed to oxygen and a temperature sufficient for a reaction between oxygen and the vaporized trimethyl aluminum to occur. The oxygen as an inert gas/oxygen mixture is introduced into the fluidized bed through holes circumferentially located on the shaft of the vibrating mixer above the vibrating disc. The coating times range from about 5.67 hours to about 7.5 hours as indicated in Table 4. Once the phosphor particles are coated with a continuous coating of aluminum oxide, they are transferred into a quartz boat and annealed at about 750° C. in static air and held at that temperature for about 4 hours in a Rapid-Temp furnace. There is about a one hour linear ramp and cool down time programmed into the annealing heating cycle. The annealing temperature can be from about 700° C. to about 850° C. and the period of time held at temperature can be from about 15 minutes to about 20 hours. After the annealing step, at least one layer of the phospor is coated in a 40W-T12 lamp using a conventional water base suspension system. In addition, at least one layer of a blend of phosphors one of which being the phosphor of this invention can be coated in a 40W-T12 lamp. The coated 40W-T12 lamp is then processed into a finished 40W-T12 lamp. The coated phosphor exhibits improved maintenace at high lumen output as opposed to uncoated phosphors.

TABLE 4

Process Conditions for CVD Aluminum Oxide Coating Of Phosphor Particles

| No | Bed Height at Temp. | Bed Loading | Ext. T.C. °C. | Flow rates (cc/min) To Distributor Bubbler | Carrier | To Agitator O₂/N₂ | Coating Time |
|---|---|---|---|---|---|---|---|
| 4-1 | 300 mm | 300 g | 370-380 | 250 | 400 | 500/50 | 7.5 hr |
| 4-2 | 320 mm | 300 g | 380-413 | 300 | 350 | 500/50 | 6.25 hr |
| 4-3 | 320 mm | 320 g | 400-413 | 300 | 350 | 500/50 | 6.58 hr |
| 4-4 | 300-350 mm | 315 g | 365-405 | 350 | 300 | 500/50 | 5.67 hr |
| 4-5 | 330 mm | 300 g | 342-356 | 300 | 350 | 500/50 | 6.25 hr |
| 4-6 | 400 mm | 375 g | 390-435 | 350 | 300 | 500/50 | 6.75 hr |

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for reproducibly producing manganese activated zinc silicate phosphor particles, said method comprising:
    (a) dry blending a mixture of components consisting essentially of zinc oxide, silicic acid, a source of manganese, ammonium chloride, ammonium fluoride, and silica, and having a Zn+Mn /Si mole ratio of from about 1.95 to about 2.02 wherein said silica is colloidal and has a surface area of from about 50 to about 410 m² per gram and wherein said colloidal silica makes up from about 0.01% to about 1.0% by weight of said mixture; and
    (b) firing the resultig dry blend of components in a nitrogen atmosphere at a temperature of from about 1200° C. to about 1300° C. for a sufficient time to produce said phosphor particles wherein said phosphor particles exhibit reproducible brightness.

2. A method according to claim 1 wherein said Zn+Mn / Si mile ratio is from about 1.97 to about 1.99.

3. A method according to claim 1 wherein said colloidal silica makes up from about 0.03% to about 0.30% by weight of said mixture.

4. A method according to claim 1 wherein the surface area of said colloidal silica is from about 100 to about 300 m$^2$ per gram.

5. A method according to claim 4 wherein said surface area is from about 175 to about 225 m$^2$ per gram.

6. A method according to claim 1 comprising the additional step of coating said phosphor particles with a continuous coating of aluminum oxide to form manganese activated zinc silicate phosphor particles having a continuous coating of aluminum oxide thereon said coated phosphor particles having improved maintenance over said phosphor particles produced absent said coating.

7. A method according to claim 6 wherein said coated phosphor particles are annealed in an air atmosphere at a temperature of from about 700° C. to about 850° C. for a period of from about 15 minutes to about 20 hours.

8. A method according to claim 1 wherein in step (a) a said mixture contains tungstic oxide in an amount sufficient to improve phosphor maintenance.

* * * * *